(No Model.)
W. A. SHAW.
SECONDARY BATTERY.
No. 316,407.  Patented Apr. 21, 1885.
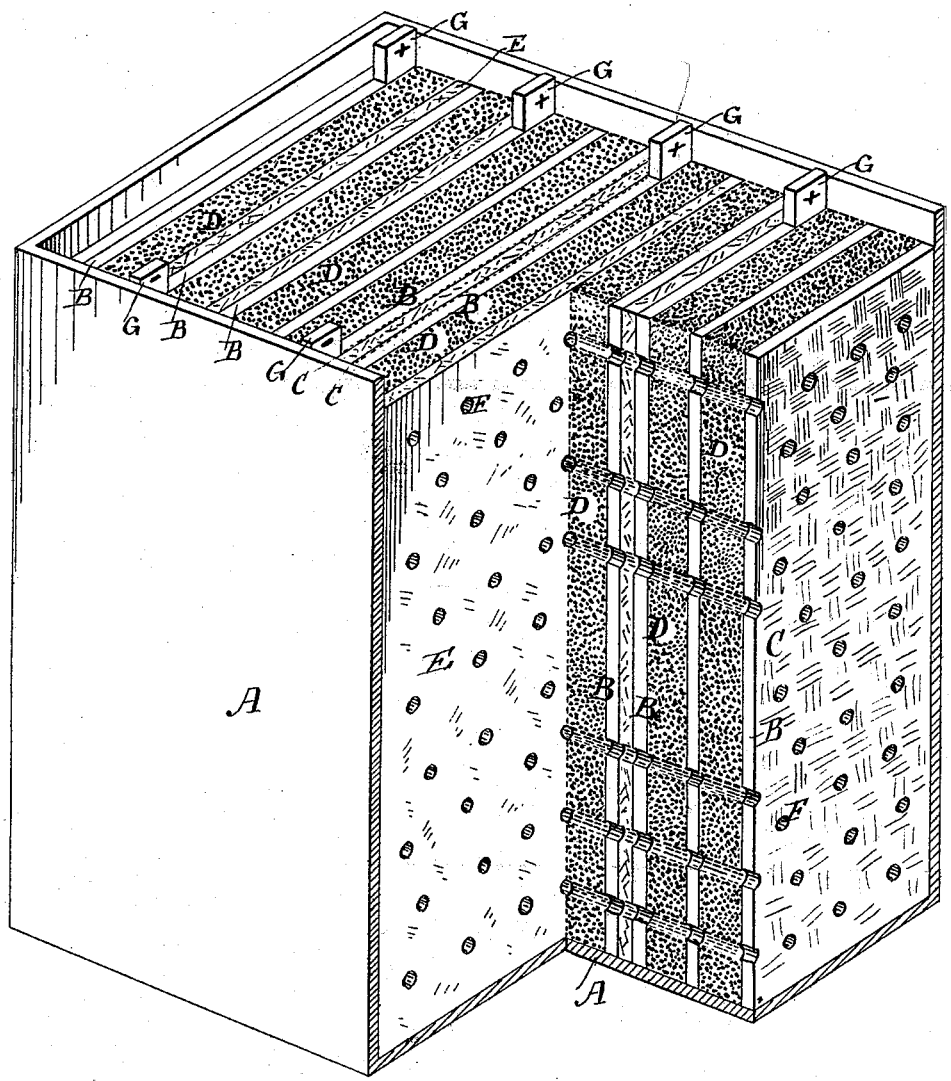
Witnesses:
E. E. Masson
C. J. Hedrick
Inventor
William Anthony Shaw
by A. Pollok
his attorney.

UNITED STATES PATENT OFFICE.

WILLIAM ANTHONY SHAW, OF BROOKLYN, ASSIGNOR TO THE ELECTRICAL ACCUMULATOR COMPANY, OF NEW YORK, N. Y.

SECONDARY BATTERY.

SPECIFICATION forming part of Letters Patent No. 316,407, dated April 21, 1885.

Application filed October 20, 1882. (No model.)

*To all whom it may concern:*

Be it known that I, WILLIAM A. SHAW, of Brooklyn, in the county of Kings and State of New York, have invented a new and useful Improvement in Secondary Batteries, which improvement is fully set forth in the following specification.

This invention relates more particularly to that class of secondary or storage batteries which have their electrodes composed each of a conducting-support and a coating or layer of active material, although not wholly limited thereto, the said support being ordinarily a plate of lead, and the active material lead in a condition which permits it readily to be oxidized or reduced—such as subdivided metallic lead or lead alloy, or an oxide or salt of lead or lead alloy.

The invention comprises improvements in the electrodes and in their manufacture.

First. The active material is united to the conducting-support by welding or casting, so that it is very firmly and permanently joined thereto. In fact, the active material penetrates the support to a certain distance, the very perfect union resulting favoring not only the retention of the active material, but also the conduction of the electricity to and from the said material. This portion of the invention can be carried into effect in various ways. If the conducting-support be a metal or alloy which can be more or less softened or fused, (*a*,) it is sufficiently heated to soften it, but without causing it to lose its solid form, and the active material being placed thereon is united thereto by pressure in a press or between rollers; or (*b*) it is reduced by heat to a plastic or pasty condition, (assumed by certain compounds of lead with other metals or with non-metallic elements, such as plumber's solder, galena, and others,) and is applied by a spatula or otherwise to the back of a layer of active material, and the whole is then cooled with or without submitting it to pressure; or, (*c*,) the metal is reduced to a plastic condition in a suitable receptacle or pan, and the layer of active material is laid thereon and, if desired, pressed thereinto, the whole being then cooled; or (*d*) the metal is fused or melted in a mold or pan, the layer of active material is placed thereon, and the mold with its contents is quickly cooled. If the conducting-support is a composition which becomes set or hardened by heat or by standing, the layer of active material is pressed therein while still plastic, and the composition forming the support is then caused or allowed to set or become hardened.

Secondly. The active material is united to the conducting-support in or during the manufacture of the latter. In the above description the support is made at the same time that the union of the active material therewith is effected, except as first described under *a*, wherein a plate already made is supposed. It is not necessary, however, that the plate should first be made. Heated ingots of lead or its alloy, or other suitable metal or alloy, may be covered with an active material—say lead oxide—and the whole rolled out into plates, bars, or sheets of the proper thickness. The ingots prior to rolling may be grooved or perforated, and the grooves or perforations be filled with active material with or without surface-covering. This method or process, originally described in my application No. 58,813, referred to below, is specially claimed in my application filed June 25, 1883, and officially numbered 99,164. It is referred to here as a particular mode of carrying out the general process of uniting the active material to the conducting-support in the manufacture of the latter. The active material may also be united to the conducting-support in or during the manufacture of the latter, by melting the metal and stirring in the active material, (as described and specifically claimed in my application 72,901, filed September 18, 1882, which is a division of my application for improvements in secondary batteries, filed April 14, 1882, and officially numbered 58,313,) or by simultaneously pressing out the active material and its conducting-support through the die of a pipe-press, (as described and specifically claimed in my application for improvement in manufacture of electric batteries, filed May 13, 1882, and numbered 61,269.)

Thirdly. In order to permit the free circulation or penetration of the electrolytic liquid, both the active material and the conducting-support are perforated or provided with holes extending through the same. These holes are best formed by punching them after the active material has been combined with the conducting-support. The electrodes may be punched separately, or where they are thin enough several may be punched at the same operation. Every form of electrode above described may be provided with holes or perforations in accordance with this portion of the invention.

It may be observed that heretofore plates or conducting-supports of electrodes for secondary batteries have been perforated. The novelty of this part of the invention resides in the perforation as well of the layer of porous active material as of the support therefor.

Fourthly. The conducting-supports are provided with a re-enforce or backing of flexible material, and specially of non-metallic fibrous fabric in the form of thin sheets. This material gives increased strength to the conducting-support without material increase of weight, and, owing to the extended surface of the conducting-support, without a proportionate increase in bulk as compared with the storage capacity. The term "re-enforce" or "backing" is used herein generically, to include not only an exterior supporting-layer, but also one wholly or partly embedded in the article to which it is applied. A re-enforce or backing may be applied to the electrode after or at the time of making the conducting-support, and after or at the time of uniting the active material to said support. For example, the re-enforce may be placed in a mold or pan and the conducting-support cast thereon; or, if the metal is plastic, it may be plastered over the re-enforce or backing, or the latter may be pressed into the plastic material, or it may be rolled or pressed into the softened metal. In these cases the re-enforce or backing is to be made of material whose integrity is not destroyed by the heat. With supports of lead or its compound, however, as the temperature is comparatively low and the heat not long continued, the use of materials commonly called "fire-proof"—such as asbestos—while admissible, and in some cases advisable, is not essential. Ordinary woven fabric, particularly woolen fabric, covered with chalk, or similar substance, or impregnated with fire-proof material—such as tungstate or silicate of soda or the like—can be employed. The re-enforce or backing may also be otherwise secured. For example, another mode is to plate by galvanic deposit a suitable depth upon the re-enforce or backing, the latter, if not conductive of electricity, being rendered so by black lead, by metallic paint, or the like. The holes or perforations referred to under "thirdly" may or may not extend through the re-enforce or backing, according as the latter is attached to the conducting-support before or after the punching operation.

Fifthly. The active material is, by preference, lead sponge. The said sponge is or may be prepared by spreading a paste of lead sulphate and water on a plate of zinc to the depth of an inch, more or less, according to the thickness of the layer of lead which it is desired to obtain, and then immersing the whole in the upper part of a bath composed of a salt (sodium chloride) solution not quite saturated. After a sufficient time, depending on the depth of the paste, the lead sulphate is converted into a coherent layer of lead sponge, which, by immersion in hot water, may be freed from the solution. The action resembles that in the formation of the well-known lead tree. The lead sponge may be formed in other analogous ways; but that described is most advantageous. Lead in this condition should be distinguished from the pulverulent lead resulting from ordinary chemical precipitation and from galvanic deposit, which has been termed "spongy." The lead sponge is carefully detached from the zinc plate, (by a knife for example,) and the sheet is then united to the conducting-support in any suitable way, but preferably by welding or casting, as above described. If the sheet is to be rolled, the rollers are preferably provided with ridges, so as to compass a part only of the sheet. The latter, if of sufficient thickness, might be consolidated in parts and used without a separate conducting-support.

The accompanying drawing represents in perspective, partly in section, a battery constructed in accordance with the invention.

A is the containing-vessel; B, the conducting-supports of the electrodes; C, the re-enforces or backings; D, the active material; E, the insulating-sheets for separating the electrodes; F, perforations or holes, and G ears or tags for attaching the exterior circuit-wires to the electrodes. As shown, the electrodes are arranged so as to be of alternately opposite polarity.

Assuming that the conducting-plates are made of an alloy of lead and antimony with or without tin, and that the active material is lead sponge, the following is or may be the mode of procedure. A thin flannel is impregnated with tungstate of soda by dipping one or more times in a solution of that salt and drying after each dipping. The fireproofed flannel is placed in the bottom of a mold, with which is combined means for suddenly chilling the same. Such molds are in common use for casting solder in bars or strips, a water-vessel being placed under the mold, and the water-level therein being raised when required till the bottom of the mold is submerged. The molten alloy is poured into the mold to form a plate or conducting-support of the desired thickness. A sheet of lead sponge of, say, triple the thickness of the conducting-support which has been previously prepared, is then laid down upon the molten metal, and the mold is suddenly cooled. The electrode may then be removed. The alloy may consist of tin, thirty per cent.; lead, sixty-six per cent., and antimony, four per cent.

The electrodes B C D, formed by casting, are punched with numerous small holes F, and then arranged in the containing-vessel with a sheet of napped woolen fabric, E, between each pair of electrodes. The electrolyte, say, a dilute (ten per cent.) solution of sulphuric acid in water, or other suitable acid, alkaline, or saline solution, is then poured into the containing-vessel A until it is filled to the desired depth. If desired, a number of electrodes may be made into a pile, with insulating-sheets between, and the whole punched at one operation.

The foregoing particular description is by way of example. It shows both the active material and the re-enforce or backing united to the conducting-support by welding or casting. As shown, the active material is on one side only of the conducting-support; but it may be placed on both sides.

Instead of lead sponge, other active material can be used—lead oxide, for example. This oxide may be pressed into a cake, with or without agglutinating materials, to admit of handling.

It is evident that modifications besides those indicated could be made without departing from the spirit of the invention—as, for example, the electrode made as described could be arranged in cells or containing-vessels, and be connected with the exterior circuit in any known or suitable way, (such arrangement and connection forming no part of the present invention,) and it is evident, also, that parts of the invention could be used separately.

Reference has been made to my application No. 58,313. As the subject-matter of the present case is taken for the most part (but not wholly) from said application, it may be well, briefly, to note the old and new features.

The union of active material to the conducting-support by welding or casting in the manufacture of the said support, the use of coherent lead sponge for the active material, and the combination of a re-enforce or backing with the conducting-support were all originally described in said application No. 58,313. The union of a layer of lead sponge or compressed oxide with the conducting-support by casting the latter to the former, the union of the re-enforce or backing to the conducting-support when the material of the latter is softened or liquefied, the use of lead alloyed with antimony for the conducting-support, and the perforations through the said support and the layer of active material thereon were not described (although some of them may have been suggested) in said case. In short, while the more prominent features are taken from the original case, certain details of construction and special combinations or minor improvements have been added for the purpose of making the description complete and harmonious. With regard to the use of lead alloyed with antimony, it is to be observed that the present invention is not limited thereto, neither is such use claimed herein, since it was used by others prior to my invention thereof.

It may also aid in the more perfect understanding of the exact scope of the present application, (which is officially numbered 74,757,) briefly, to show the dividing-lines between itself and the other applications mentioned.

The manufacture of a secondary battery by application of active material, and specially of red lead and other oxides or reducible compounds of lead to a conducting-support, the use of perforated plates as the conducting-supports, the use of porous retaining media for holding the active material against the conducting-support, and other features of a like general nature are reserved to my original application No. 58,313.

The distribution of the active material throughout the body of the conducting-support, (which is no necessary part of the present invention, although not excluded from use in connection with the latter or a part thereof,) with some related features, forms the subject of application No. 72,901, while Nos. 61,269 and 99,164 both contemplate the use of pressure in the manufacture of the elements or electrodes and the reduction of a compound charge or ingot, features which, like the distribution of the active material through the conducting-support, are not necessary to carry out the present invention, but may, and, as described in said applications, do involve in their use some of the general improvements herein claimed.

Having now fully described my said invention and the manner of carrying the same into effect, what I claim is—

1. In the manufacture of electrodes for secondary batteries, the improvement consisting in uniting the active material to the conducting-support by welding or casting, substantially as described.

2. In the manufacture of electrodes for secondary batteries, the improvement consisting in uniting the active material in the form of a coherent sheet or plate to the conducting-support, also in the form of a coherent sheet or plate by welding or casting the latter thereon, substantially as described.

3. In the manufacture of electrodes for secondary batteries, the improvement consisting in uniting the active material in the form of a sheet of coherent lead sponge to the conducting-support by welding or casting, substantially as described.

4. In the manufacture of electrodes for secondary batteries, the improvement consisting in preparing a sheet of coherent lead sponge, and then fastening the same to a parallel plate constituting a support for the said sheet of lead sponge, substantially as described.

5. In electrodes for secondary batteries, the improvement consisting in uniting, in the manner described—by casting, for example—a flexible re-enforce or backing of fibrous fabric to the conducting-support of the electrode, substantially as described.

6. In electrodes for secondary batteries, the improvement consisting in uniting the active material to the conducting-support and then perforating both the active material and the support, substantially as described.

7. In the manufacture of electrodes for secondary batteries, the improvement consisting in uniting the active material to the conducting-support of a weldable, fusible, or plastic metal, such as lead, in or during the manufacture of the said support while the lead is in process of molding or casting, substantially as described.

8. In the manufacture of electrodes for secondary batteries, the improvement consisting in preparing a sheet of coherent lead sponge for the active material, uniting it to a conducting-support by welding or casting, incorporating into said conducting-support a flexible re-enforce or backing of fibrous fabric, and perforating the said active material and the conducting-support, substantially as described.

In testimony whereof I have signed this specification in the presence of two subscribing witnesses.

WM. ANTHONY SHAW.

Witnesses:
PHILIP MAURO,
C. J. HEDRICK.